United States Patent
Bacchus et al.

(10) Patent No.: US 12,092,458 B2
(45) Date of Patent: Sep. 17, 2024

(54) SYSTEM AND PROCESS FOR CORRECTING GYROSCOPE DRIFT FOR A MOTOR VEHICLE

(71) Applicant: GM Global Technology Operations LLC, Detroit, MI (US)

(72) Inventors: Brent Navin Roger Bacchus, Sterling Heights, MI (US); Rakesh Kumar, Mississauga (CA); Curtis L. Hay, Washington Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 449 days.

(21) Appl. No.: 17/539,700

(22) Filed: Dec. 1, 2021

(65) Prior Publication Data

US 2023/0168088 A1   Jun. 1, 2023

(51) Int. Cl.
*G01C 19/00* (2013.01)
*G01S 13/931* (2020.01)

(52) U.S. Cl.
CPC ............ *G01C 19/00* (2013.01); *G01S 13/931* (2013.01)

(58) Field of Classification Search
CPC .... G01C 19/00; G01C 22/025; G01C 25/005; G01C 21/165; G01C 21/18; G01C 19/005; G01C 19/34; G01C 19/42; G01C 21/06; G01S 13/931; G01S 2013/932; G01S 13/86; G01S 2013/93271; G01S 7/4026; G01S 13/88; G01S 13/60
See application file for complete search history.

(56) References Cited

U.S. PATENT DOCUMENTS

| | | | |
|---|---|---|---|
| 10,399,492 B1 | 9/2019 | Paraskevas et al. | |
| 10,839,524 B2 | 11/2020 | Bacchus | |
| 10,859,673 B2 | 12/2020 | Bush et al. | |
| 2011/0295549 A1* | 12/2011 | Takabayashi | G01S 13/86 702/142 |
| 2016/0291143 A1* | 10/2016 | Cao | G01S 13/874 |
| 2018/0340779 A1* | 11/2018 | Faulkner | G01C 21/188 |
| 2019/0337451 A1 | 11/2019 | Bacchus et al. | |
| 2019/0391049 A1* | 12/2019 | Jones | B61L 15/0081 |
| 2020/0149896 A1 | 5/2020 | Bush et al. | |
| 2020/0318976 A1 | 10/2020 | Bush et al. | |
| 2021/0061293 A1 | 3/2021 | Bacchus et al. | |
| 2021/0149415 A1 | 5/2021 | Bush et al. | |
| 2021/0254998 A1* | 8/2021 | Vissiere | G01C 22/00 |

\* cited by examiner

*Primary Examiner* — Abby Y Lin
*Assistant Examiner* — Esvinder Singh
(74) *Attorney, Agent, or Firm* — Vivacqua Crane, PLLC (57) ABSTRACT

A system of a motor vehicle includes a radar unit for generating a radar signal associated with a target positioned about the vehicle. The system further includes a tracker generating a tracker signal associated with a radar heading and a doppler based on the radar signal. The system further includes a wheel speed sensor for generating a wheel speed signal associated with a velocity of the vehicle. The system further includes a gyroscope for generating a gyro signal associated with a measured yaw rate. The system further includes a computer having a processor and a computer readable medium. The processor is programmed to determine a gyro drift and a corrected yaw rate while the vehicle is in motion, with the gyro drift and the corrected yaw rate being based on at least the radar heading, the doppler effect, and the velocity of the vehicle, and the measured yaw rate.

14 Claims, 2 Drawing Sheets

SYSTEM AND PROCESS FOR CORRECTING GYROSCOPE DRIFT FOR A MOTOR VEHICLE

INTRODUCTION

The present disclosure relates to motor vehicles with systems having gyroscopes, and more particularly to a system and process for determining a gyro drift and a corrected yaw rate based on at least radar signals, wheel speed sensor signals, temperature signals, and gyroscope signals.

Automotive systems with inertial sensors, such as gyroscopes, are prone to errors that are of the deterministic type and the stochastic type. Deterministic errors, such as bias and scale factor, can be resolved via lab calibrations. However, stochastic errors, such as bias drift, can only be modeled mathematically. Stochastic errors are a primary source of measurement error because an uncompensated gyro bias (expressed in terms of deg/h or radians/s) produces an angle error that is directly proportional to the passage of time t. Hence, the yaw axis is most sensitive to the gyro drift, which decreases the accuracy of systems using gyroscopes. In particular, gyroscope drift can limit yaw accuracy over increasingly longer periods of time, and radar alignment may change over time, which in turn further decreases accuracy of the associated system.

Known systems including gyroscopes can further include radar units for recalibrating a gyroscope. However, these systems are used in a batch mode architecture that requires the vehicle to be stopped during recalibration. Further, the accuracy of these systems can be inaccurate to the extent that the systems do not recalibrate gyroscopes based any data other than radar data.

One example of these systems can include advanced driving assistance systems ("ADAS") with gyroscopes for determining attitude and pose. The ADAS can further include global positioning system modules ("GPS modules") for precisely determining a location and heading of the motor vehicle to facilitate with detecting gyroscope drift and recalibrating the gyroscope. However, the ability of the GPS modules to perform these functions can be challenged when the vehicles are located in tunnels, deep urban areas, or other regions with poor or absent GPS signals.

Thus, while existing systems achieve their intended purpose, there is a need for a new and improved system and process that address these issues.

SUMMARY

According to several aspects of the present disclosure, a system of a motor vehicle includes a radar unit for generating a radar signal associated with a detected target positioned about the motor vehicle. The system further includes a tracker coupled to the radar unit. The tracker generates a tracker signal associated with a current radar heading and a current doppler for a stationary target based on the radar signal. The system further includes a wheel speed sensor for generating a wheel speed signal associated with a current velocity of the motor vehicle. The system further includes a temperature sensor for generating a temperature signal associated with an ambient temperature. The system further includes a gyroscope for generating a gyro signal associated with a measured yaw rate at a current time step. The system further includes a computer having one or more processors coupled to the tracker, the wheel speed sensor, the temperature sensor, and the gyroscope. The computer further includes a non-transitory computer readable storage medium ("CRM") storing instructions, such that the processor is programmed to determine a gyro drift and a corrected yaw rate while the motor vehicle is in motion, based on at least the current radar heading, the current doppler effect, the current velocity of the motor vehicle, and the measured yaw rate at the current time step.

In one aspect, the processor is further programmed to receive the tracker signal from the tracker, the wheel speed signal from the wheel speed sensor, the temperature signal from the temperature sensor, and the gyro signal from the gyroscope at the current time step. The processor is further programmed to determine with a Kalman filter an innovation vector, based on a difference between the tracker signal, the wheel speed signal, the temperature signal, the gyro signal, and a plurality of associated predicted observations. The processor is further programmed to generate an adapted measurement covariance matrix for robustness, based on the innovation vector, and further based on a measurement covariance matrix. The processor is further programmed to update the Kalman filter based on the tracker signal, the wheel speed signal, the temperature signal, and the gyro signal. The processor is further programmed to predict at least one of the predicted radar heading, the predicted doppler, an estimated gyro scale factor of the gyroscope, a wheel speed sensor scale factor of the wheel speed sensor, and the gyro drift of the gyroscope based on the updated Kalman filter.

In another aspect, the processor determines a whitened innovation ê according to a maximum correntropy variation of the Kalman filter, by computing:

$$\hat{e} = R^{-1/2} e$$

where e represents a current innovation related to an error between an actual measurement vector z and a predicted measurement vector (i.e. e=z-Hx, where x is a predicted state vector and H is a linearized measurement covariance matrix). In addition, $$R^{-1/2}$$

indicates an inverse of a Cholesky decomposition of the measurement covariance matrix.

In another aspect, the processor generates the adapted measurement covariance matrix according to:

$$\mathcal{K}_\beta(x) = e^{-\frac{x^2}{2\beta^2}}$$

$$C = \text{diag}(\mathcal{K}_\beta(\hat{e}_1), \ldots \mathcal{K}_\beta(\hat{e}_N))$$

$$\hat{R} = R^{1/2} C^{-1} R^{T/2}$$

where $K_\beta(x)$ represents a kernel function; $\beta$ represents a positive tuning parameter; $\hat{e}_i$ represents an element i in a vector ê; C represents an adapted measurement covariance matrix; $\hat{R}$ represents an updated measurement covariance matrix; and T represents a matrix transpose operator. This process may be iterated after running the Kalman filter update step using the latest state estimate in place of the predicted state to determine the innovation.

In another aspect, the processor updates the Kalman filter with an implicit nonlinear observation model to estimate at least a gyro scale factor and the gyro drift according to:

$$\begin{pmatrix} w_z x_R^B \sin(\beta_0 + \beta + \hat{\phi}_i) - w_z y_R^B \cos(\beta_0 + \beta + \hat{\phi}_i) \\ + v_y \sin(\beta_0 + \beta + \hat{\phi}_i) - v_x \cos(\beta_0 + \beta + \hat{\phi}_i) + \hat{d}_i \\ \cdots \\ \alpha_{gyro} w_z + \gamma_{gyro} - \hat{w}_{z,gyro} \\ \alpha_{wss} v_x - \hat{v}_{x,wss} \end{pmatrix} = 0$$

where $w_z$ represents the corrected yaw rate of the motor vehicle; $x_R^B$ represents an X-coordinate of the radar unit on the motor vehicle; $y_R^B$ represents a Y-coordinate of the radar unit on the motor vehicle; $\beta_0$ represents a nominal mounting azimuth angle of the radar unit; $\beta$ represents a calibration error of the radar unit; $\hat{\phi}_i$ represents the radar heading associated with the tracking signal; $v_y$ represents a lateral velocity of the motor vehicle; $v_x$ represents a longitudinal velocity of the motor vehicle; $\hat{v}_{x,wss}$ represents an estimated longitudinal velocity of the motor vehicle; d represents the doppler speed associated with the tracking signal; $\alpha_{gyro}$ represents the gyro scale factor; $\alpha_{wss}$ represents a wheel speed sensor scale factor; $\gamma_{gyro}$ represents a gyro drift; n represents an iid noise; and $\hat{w}_{z,gyro}$ represents the measured yaw rate associated with the gyro signal generated by the gyroscope.

In another aspect, the processor predicts at least one of an estimated gyro scale factor, a wheel speed sensor scale factor, and the gyro drift based on the updated Kalman filter with a process model according to:

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t$$

where $G_u$ represents a predictor for the gyro drift; $\gamma_{gyro} = (\gamma_{t-T_w} \ldots \gamma_{t-1}, \gamma_t)$ is vector of size $T_w$ of previous gyro bias estimates and t represents the current time step; and t+1 represents a next time step.

In another aspect, the processor predicts at least one of the estimated gyro scale factor, the wheel speed sensor scale factor, and the gyro drift further based on the updated Kalman filter with a process noise according to:

$$Q = \begin{pmatrix} \sigma_{w_z}^2 & & & & & & \\ & \sigma_{v_x}^2 & & & & & \\ & & \sigma_{v_y}^2 & & & & \\ & & & \sigma_{\alpha_{gyro}}^2 & & & \\ & & & & \sigma_{\alpha_{wss}}^2 & & \\ & & & & & P_u & \\ & & & & & & \sigma_\epsilon^2 \end{pmatrix}$$

In another aspect, the processor further predicts the gyro drift according to:

$G_u(x_v) = K_{vu} K_{uu}^{-1}$ $P_u(x_v) = K_{vv} K_{uu}^{-1} - G_u(x_v) K_{wv}$ $K_{ij} = [k(x_i, x_j)]$ where the gyro drift is modeled as a zero mean Gaussian process with a known covariance kernel $k(\cdot, \cdot)$.

In another aspect, the processor predicts the gyro drift of the gyroscope according to:

$x = (t \ v \ w \ T_w)^{Tw}$ $x_u = (x_{t-T_w}, \ldots, x_{t-1}, x_t)$ $x_v = (x_{t-T_w+1}, \ldots, x_t, x_{t+1})$ where x represents an independent predictor variable for the gyro drift of the gyroscope; t represents the current time step; v represents the longitudinal velocity; w represents the yaw rate; $x_u$ represents a predictive variable for the gyro drift of the gyroscope for the previous time step; and $x_v$ represents a predictive variable for the gyro drift of the gyroscope for the current time step.

In another aspect, the processor further predicts the gyro drift of the gyroscope according to a spectral mixture kernel:

$$k(d) = \sum_{i=1}^{N} \sigma_i^2 \exp\left(2\pi^2 d^T \left(\sum_i C\right)^{-1} d\right) \cos(2\pi d f_i)$$

where $C = C(\psi)$ which is a spherically parameterized correlation matrix which models a correlation between the predictor variables for the previous and current time steps and $\Sigma_i = \text{diag}(\sigma_i^{(1)} \ldots \sigma_i^{(4)})$; and a plurality of parameters $\{\sigma_i^2, \Sigma_i, f_i\}_{i=1}^{N}$, $\psi$ is learned from data. For computational reasons, the predictor vectors may be assumed to lay on a regular grid so that the Kronecker structure may be exploited.

According to several aspects of the present disclosure, a computer is provided for a system of a motor vehicle. The system includes a radar unit for generating a radar signal associated with a detected target positioned about the motor vehicle. The system further includes a tracker coupled to the radar unit. The tracker generates a tracker signal associated with a current radar heading and a current doppler for a stationary target based on the radar signal. The system further includes a wheel speed sensor for generating a wheel speed signal associated with a current velocity of the motor vehicle. The system further includes a temperature sensor for generating a temperature signal associated with an ambient temperature. The system further includes a gyroscope for generating a gyro signal associated with a measured yaw rate at a current time step. The computer includes one or more processors coupled to the tracker, the wheel speed sensor, and the gyroscope. The computer further includes a non-transitory computer readable storage medium ("CRM") including instructions. The processor is further programmed to determine a gyro drift and a corrected yaw rate while the motor vehicle is in motion, with the gyro drift and a corrected yaw rate being based on at least the current radar heading, the current doppler effect, the current velocity of the motor vehicle, and the measured yaw rate at the current time step.

In one aspect, the processor is further programmed to receive the tracker signal from the tracker, the wheel speed signal from the wheel speed sensor, the temperature signal from the temperature sensor, and the gyro signal from the gyroscope at the current time step. The processor is further programmed to determine with a Kalman filter an innovation vector, based on a difference between the tracker signal, the wheel speed signal, the temperature signal, the gyro signal, and a plurality of associated predicted observations. The processor is further programmed to generate an adapted measurement covariance matrix for robustness, based on the innovation vector, and further based on a measurement covariance matrix. The processor is further programmed to update the Kalman filter based on the tracker signal, the wheel speed signal, the temperature signal, and the gyro signal. The processor is further programmed to predict at least one of the predicted radar heading, the predicted doppler, an estimated gyro scale factor of the gyroscope, a wheel speed sensor scale factor of the wheel speed sensor, and the gyro drift of the gyroscope based on the updated Kalman filter.

In another aspect, the processor determines a whitened innovation e according to a maximum correntropy variation of the Kalman filter, by computing:

$$\hat{e} = R^{-1/2} e$$

where e represents a current innovation related to an error between an actual measurement vector z and a predicted measurement vector (i.e. e=z−Hx, where x is a predicted state vector and H is a linearized measurement covariance matrix). In addition, $$R^{-1/2}$$

indicates an inverse of a Cholesky decomposition of the measurement covariance matrix.

In another aspect, the processor generates the adapted measurement covariance matrix according to:

$$\mathcal{K}_\beta(x) = e^{-\frac{x^2}{2\beta^2}}$$
$$C = \mathrm{diag}(\mathcal{K}_\beta(\hat{e}_1), \ldots \mathcal{K}_\beta(\hat{e}_N))$$
$$\hat{R} = R^{1/2} C^{-1} R^{T/2}$$

where $K_\beta(x)$ represents a kernel function; $\beta$ represents a positive tuning parameter; $\hat{e}_i$ represents an element i in a vector $\hat{e}$; C represents an adapted measurement covariance matrix; $\hat{R}$ represents an updated measurement covariance matrix; and T represents a matrix transpose operator. This process may be iterated after running the Kalman filter update step using the latest state estimate in place of the predicted state to determine the innovation.

In another aspect, the processor updates the Kalman filter with an implicit nonlinear observation model to estimate at least a gyro scale factor and the gyro drift according to:

$$\begin{pmatrix} w_z x_R^B \sin(\beta_0 + \beta + \hat{\phi}_i) - w_z y_R^B \cos(\beta_0 + \beta + \hat{\phi}_i) \\ + v_y \sin(\beta_0 + \beta + \hat{\phi}_i) - v_x \cos(\beta_0 + \beta + \hat{\phi}_i) + \hat{d}_i \\ \ldots \\ \alpha_{gyro} w_z + \gamma_{gyro} - \hat{w}_{z,gyro} \\ \alpha_{wss} v_x - \hat{v}_{x,wss} \end{pmatrix} = 0$$

where $w_z$ represents the corrected yaw rate of the motor vehicle; $x_R^B$ represents an X-coordinate of the radar unit on the motor vehicle; $y_R^B$ represents a Y-coordinate of the radar unit on the motor vehicle; $\beta_0$ represents a nominal mounting azimuth angle of the radar unit; $\beta$ represents a calibration error of the radar unit; $\hat{\phi}_i$ represents the radar heading associated with the tracking signal; $v_y$ represents a lateral velocity of the motor vehicle; $v_x$ represents a longitudinal velocity of the motor vehicle; $\hat{v}_{x,wss}$ represents an estimated longitudinal velocity of the motor vehicle; $\hat{d}_i$ represents the doppler speed associated with the tracking signal; $\alpha_{gyro}$ represents the gyro scale factor; $\alpha_{wss}$ represents a wheel speed sensor scale factor; $\gamma_{gyro}$ represents the gyro drift; n represents an iid noise; and $\hat{w}_{z,gyro}$ represents the measured yaw rate associated with the gyro signal generated by the gyroscope.

In another aspect, the processor predicts at least one of an estimated gyro scale factor, a wheel speed sensor scale factor, and the gyro drift further based on the updated Kalman filter with a process model according to:

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t$$

where $G_u$ represents a predictor for the gyro drift; $\gamma_{gyro} = (\gamma_{t-T_w}, \ldots \gamma_{t-1}, \gamma_t)$ is vector of size $T_w$ of previous gyro bias estimates and t represents the current time step; and t+1 represents a next time step.

In another aspect, the processor predicts at least one of the estimated gyro scale factor, the wheel speed sensor scale factor, and the gyro drift further based on the updated Kalman filter with a process noise according to:

$$Q = \begin{pmatrix} \sigma_{w_z}^2 & & & & & & \\ & \sigma_{v_x}^2 & & & & & \\ & & \sigma_{v_y}^2 & & & & \\ & & & \sigma_{\alpha_{gyro}}^2 & & & \\ & & & & \sigma_{\alpha_{wss}}^2 & & \\ & & & & & P_u & \\ & & & & & & \sigma_\epsilon^2 \end{pmatrix}$$

According to several aspects of the present disclosure, a process is provided for operating a system for a motor vehicle. The system includes a radar unit, a tracker coupled to the radar unit, a wheel speed sensor, a temperature sensor, and a gyroscope. The system further includes a computer coupled to the tracker, the wheel speed sensor, the temperature sensor, and the gyroscope. The computer includes one or more processors and a non-transitory computer readable storage medium including instructions. The process includes generating, using the radar unit, a radar signal associated with a detected target positioned about the motor vehicle. The process further includes generating, using the tracker, a tracker signal associated with a current radar heading and a current doppler for a stationary target based on the radar signal. The process further includes generating, using the wheel speed sensor, a wheel speed signal associated with a current velocity of the motor vehicle. The process further includes generating, using the temperature sensor, a temperature signal associated with an ambient temperature. The process further includes generating, using the gyroscope, a gyro signal associated with a measured yaw rate at a current time step. The process further includes determining, with the processor, a gyro drift and a corrected yaw rate while the motor vehicle is in motion, with the gyro drift and the corrected yaw rate based on at least the current radar heading, the current doppler effect, the current velocity of the motor vehicle, and the measured yaw rate at the current time step.

In one aspect, the process further includes receiving, with the processor, the tracker signal from the tracker, the wheel speed signal from the wheel speed sensor, the temperature signal from the temperature sensor, and the gyro signal from the gyroscope at the current time step. The process further includes determining, with the processor using a Kalman filter, an innovation, based on a difference between the tracker signal, the wheel speed signal, the temperature signal, the gyro signal, and a plurality of associated predicted observations. The process further includes generating, using the processor, an adapted measurement covariance matrix for robustness, based on the innovation vector, and further based on a measurement covariance matrix. The process further includes updating, using the processor, the Kalman filter based on the tracker signal, the wheel speed signal, the temperature signal, and the gyro signal. The process further includes predicting, using the processor, at least one of the predicted radar heading, the predicted doppler, an estimated gyro scale factor of the gyroscope, a wheel speed sensor scale factor of the wheel speed sensor, and the gyro drift of the gyroscope based on the updated Kalman filter.

In another aspect, the process further includes the processor determining the gyro drift according to:

$$e = R^{-1/2}e$$

$$\mathcal{K}_\beta(x) = e^{-\frac{x^2}{2\beta^2}}$$

$$C = \text{diag}(\mathcal{K}_\beta(\hat{e}_1), \ldots \mathcal{K}_\beta(\hat{e}_N))$$

$$\hat{R} = R^{1/2}C^{-1}R^{T/2}$$

$$\begin{pmatrix} w_z x_R^B \sin(\beta_0 + \beta + \hat{\phi}_i) - w_z y_R^B \cos(\beta_0 + \beta + \hat{\phi}_i) \\ + v_y \sin(\beta_0 + \beta + \hat{\phi}_i) - v_x \cos(\beta_0 + \beta + \hat{\phi}_i) + \hat{d}_i \\ \cdots \\ \alpha_{gyro} w_z + \gamma_{gyro} - \hat{w}_{z,gyro} \\ \alpha_{wss} v_x - \hat{v}_{x,wss} \end{pmatrix} = 0$$

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t$$

where e represents the current innovation, related to an error between the actual measurement vector z and the predicted measurement vector (i.e. e=z−Hx, where x is the predicted state vector and H is the linearized measurement covariance matrix);

$$R^{-1/2}$$

indicates the inverse of the Cholesky decomposition of the measurement covariance matrix; e represents a previous innovation determined at the previous time step; $K_\beta(x)$ represents a kernel function; $\beta$ represents a positive tuning parameter; $\hat{e}_i$ represents an element i in a vector $\hat{e}$; C represents an adapted measurement covariance matrix; $\hat{R}$ represents an updated measurement covariance matrix; T represents a matrix transpose operator; $w_z$ represents the corrected yaw rate of the motor vehicle; $x_R^B$ represents an X-coordinate of the radar unit on the motor vehicle; $y_R^B$ represents a Y-coordinate of the radar unit on the motor vehicle; $\beta_0$ represents a nominal mounting azimuth angle of the radar unit; $\beta$ represents a calibration error of the radar unit; $\hat{\phi}_i$ represents the radar heading associated with the tracking signal; $v_y$ represents a lateral velocity of the motor vehicle; $v_x$ represents a longitudinal velocity of the motor vehicle; $\hat{v}_{x,wss}$ represents an estimated longitudinal velocity of the motor vehicle; $\hat{d}_i$ represents the doppler speed associated with the tracking signal; $\alpha_{gyro}$ represents the gyro scale factor; $\alpha_{wss}$ represents a wheel speed sensor scale factor; $\gamma_{gyro}$ represents the gyro drift; n represents an iid noise; $\hat{w}_{z,gyro}$ represents the measured yaw rate associated with the gyro signal generated by the gyroscope; $G_u$ represents a predictor for the gyro drift; t represents the current time step; and t+1 represents a next time step.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a motor vehicle having a system with a gyroscope, a radar unit, a tracker, a temperature sensor, and a computer that determines a gyroscope drift and a corrected yaw rate. More specifically, in the non-limiting example described in detail below, the system is implemented in an advanced driver assistance system ("ADAS") with the gyroscope for determining pose and attitude of the motor vehicle and integrating angular rates of the motor vehicle, such as pitch, roll, and yaw rates. However, it is contemplated that the system can be implemented in any other suitable automotive or non-automotive systems having a gyroscope. The computer is programmed to estimate the kinematics of the vehicle by using the radar unit, the tracker, the wheel speed sensor, the temperature sensor, and the gyroscope without requiring the motor vehicle to stop. As described in detail below, the tracker identifies one or more static targets based on a lack of motion of those targets. The processor uses predictions from a Kalman filter to adapt the provided covariance to reduce the impact of unmodelled noise. The processor further utilizes the Kalman filter to fuse radar signals, WSS information, ambient temperature data, and gyroscope signals at to estimate a corrected or unbiased yaw rate.

Figure 1:
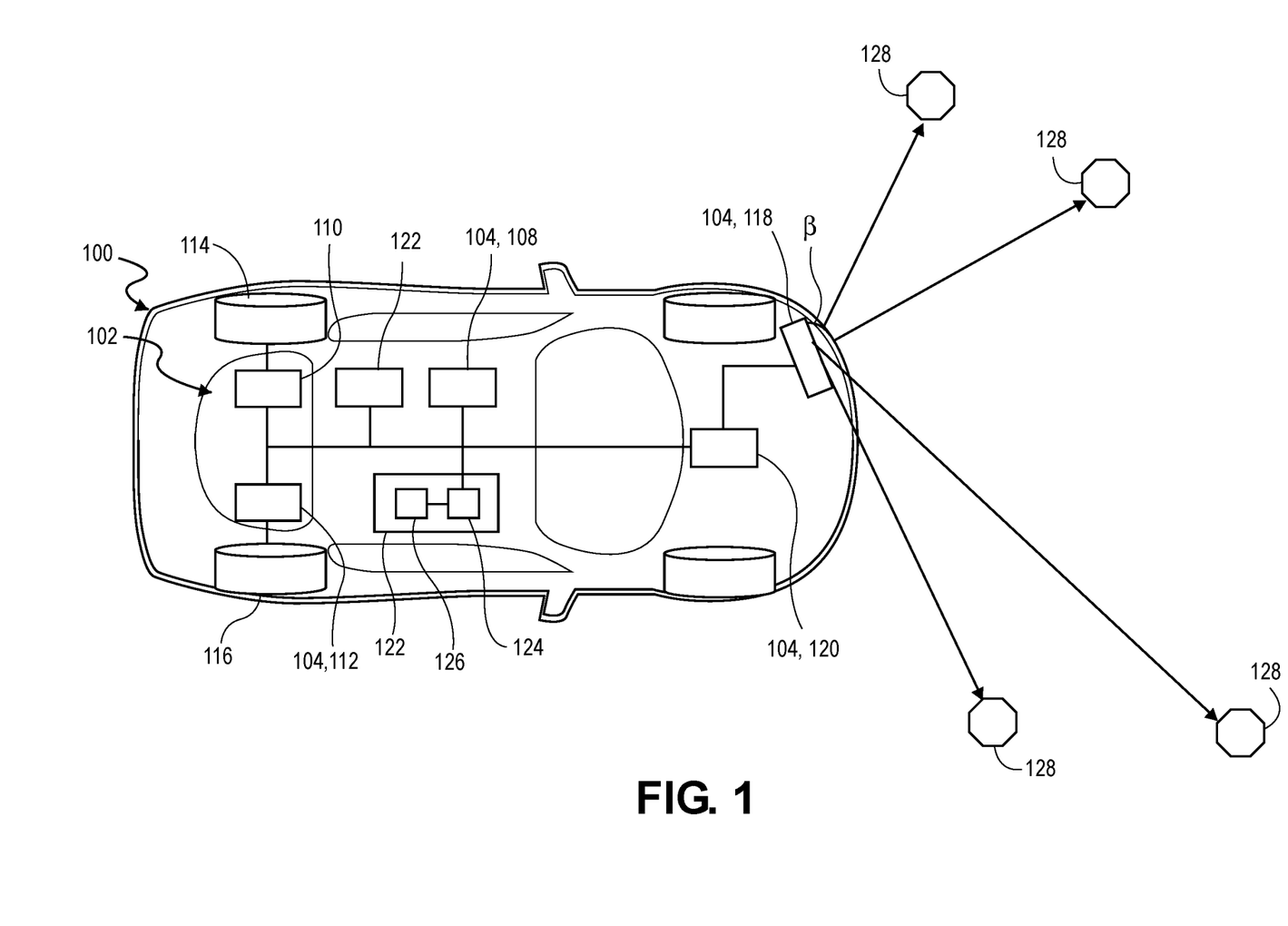
FIG. 1 is a schematic view of one example of a motor vehicle having a system with a radar unit, a tracker, a wheel speed sensor, a temperature sensor, a gyroscope, and a computer for recalibrating the gyroscope.

Referring now to FIG. 1, a non-limiting example of a motor vehicle 100 includes a system 102 implemented in an advanced driver assistance system 102 ("ADAS"). While the motor vehicle 100 is illustrated as a passenger vehicle, the motor vehicle 100 could be any other suitable vehicle type, including a truck, a sports utility vehicle (SUV), a recreational vehicle, a bus, aircraft, marine vessel, or the like that has the system 102. In at least one example, the motor vehicle 100 is configured to operate in at least one of a plurality of autonomous modes, as defined by the Society of Automotive Engineers (SAE) (which has defined operation at levels 0-5). For example, the motor vehicle 100 may receive and process two- and/or three-dimensional data of its surroundings and further may be programmed and/or configured to store and execute logic instructions embodied in hardware, software, firmware, a combination thereof, or the like, and to enable the motor vehicle 100 to operate with some user assistance (partial autonomy) or without any user assistance (full autonomy). For example, according to levels 0-2, a human driver monitors or controls the majority of the driving tasks, often with no help from the motor vehicle 100. For example, at level 0 ("no automation"), a human driver is responsible for all vehicle operations. At level 1 ("driver assistance"), the motor vehicle 100 sometimes assists with steering, acceleration, or braking, but the driver is still responsible for the vast majority of the vehicle control. At level 2 ("partial automation"), the motor vehicle 100 can control steering, acceleration, and braking under certain circumstances without human interaction. At levels 3-5, the motor vehicle 100 assumes more driving-related tasks. At level 3 ("conditional automation"), the motor vehicle 100 can handle steering, acceleration, and braking under certain circumstances, as well as monitoring of the driving environment. Level 3 may require the driver to intervene occasionally, however. At level 4 ("high automation"), the motor vehicle 100 can handle the same tasks as at level 3 but without relying on the driver to intervene in certain driving modes. At level 5 ("full automation"), the motor vehicle 100 can handle all tasks without any driver intervention. In at least one example, the motor vehicle 100 is configured to operate according to one of levels 2-5.

The ADAS 102 may include one or more sensors 104 and one or more computers 106. In this non-limiting example, the sensors 104 may include a gyroscope 108 for generating a gyro signal associated with a measured yaw rate at a current time step. The sensors 104 may further include a pair of wheel speed sensors 110, 112 coupled to an associated one of two wheels 118, 120. Each wheel speed sensor 110, 112 generates a wheel speed signal associated with a current velocity of the motor vehicle 100. The sensors 104 may further include a radar unit 118 for generating a radar signal associated with a detected target positioned about the motor vehicle 100. The sensors 104 may further include a tracker 120 coupled to the radar unit 118 and generating a tracker signal associated with a current radar heading and a current doppler for a stationary target based on the radar signal. More specifically, the tracker 120 determines the associated untracked heading, the doppler (along with corresponding error covariances), and the identification of the stationary targets. The sensors 104 may further include a temperature sensor 122 for generating a temperature signal associated with an ambient temperature.

It is contemplated that the ADAS can have any number of each of these sensors and/or other suitable sensors. A non-exhaustive and non-limiting list of other vehicle sensors can include one or more of a vehicle pitch sensor, a vehicle roll sensor, a motion sensor, a proximity sensor, a laser identification detection and ranging (LIDAR) sensor, an imaging sensor (e.g., a complementary metal oxide semiconductor (CMOS) sensor, a charge-coupled sensor (CCDs), an image intensifying sensor, etc.), an infrared sensor, a thermal sensor, a short-, medium-, or long-range wireless signal sensor, a vehicle position sensor (e.g., a Global Positioning System (GPS) and a Global Navigation Satellite System (GLONASS) sensor), a vehicle acceleration sensor, a vehicle braking sensor, and a vehicle steering sensor, just to name a few examples.

The system 102 further includes one or more computers 122. Each computer 106 includes one or more processors 124 coupled to the gyroscope 108, the wheel speed sensors 110, 112, the tracker 120, and the temperature sensor 122. Each computer 106 further includes a non-transitory computer readable storage medium 126 ("CRM") including instructions, such that the processor 124 is programmed to determine a gyro drift and a corrected yaw rate while the motor vehicle 100 is in motion, with the gyro drift and the corrected yaw rate based on at least the current radar heading, the current doppler effect, the current velocity of the motor vehicle 100, and the measured yaw rate at the current time step. More specifically, as descried in the non-limiting detailed example below, the processor 124 is programmed to receive the tracker signal from the gyro signal from the gyroscope 108, the wheel speed signal from the wheel speed sensors 110, 112, the tracker 120, and the temperature sensor 122 at the current time step, determine the gyro drift, and determine a corrected yaw rate based on the same.

The processor 124 is programmed to determine with a Kalman filter an innovation vector, based on a difference between the tracker signal, the wheel speed signal, the temperature signal, the gyro signal, and a plurality of associated predicted observations. The processor 124 determines a whitened innovation e according to:

$$\hat{e} = R^{-1/2} e$$

where e represents the current innovation, related to an error between an actual measurement vector z and a predicted measurement vector (i.e. e=z−Hx, where x is a predicted state vector and H is a linearized measurement covariance matrix); where $$R^{-1/2}$$

indicates an inverse of a Cholesky decomposition of the linearized measurement covariance matrix.

The processor 124 is programmed to generate an adapted measurement covariance matrix for robustness, based on the innovation vector, and further based on a measurement covariance matrix. More specifically, the processor 124 generates the adapted measurement covariance matrix according to:

$$\kappa_\beta(x) = e^{-\frac{x^2}{2\beta^2}} \qquad \text{Eq. 2}$$

$$C = \text{diag}(\kappa_\beta(\hat{e}_1), \ldots \kappa_\beta(\hat{e}_N)) \qquad \text{Eq. 3}$$

$$\hat{R} = R^{1/2} C^{-1} R^{T/2} \qquad \text{Eq. 4}$$

where $K_\beta(x)$ represents a kernel function; $\beta$ represents a positive tuning parameter; $\hat{e}_i$ represents an element i in a vector $\hat{e}$; C represents an adapted measurement covariance matrix; $\hat{R}$ represents an updated measurement covariance matrix; and T represents a matrix transpose operator. This process may be iterated after running the Kalman filter update step using the latest state estimate in place of the predicted state to determine the innovation.

The processor 124 is programmed to update the Kalman filter with an implicit nonlinear observation model to further estimate at least a gyro scale factor and the gyro drift according to:

$$\begin{pmatrix} w_z x_R^B \sin(\beta_0 + \beta + \hat{\phi}_i) - w_z y_R^B \cos(\beta_0 + \beta + \hat{\phi}_i) + \\ v_y \sin(\beta_0 + \beta + \hat{\phi}_i) - v_y \cos(\beta_0 + \beta + \hat{\phi}_i) + \hat{d}_i \\ \ldots \\ \alpha_{gyro} w_z + \gamma_{gyro} - \hat{w}_{z,gyro} \\ \alpha_{wss} v_x - \hat{v}_{x,wss} \end{pmatrix} = 0 \quad \text{Eq. 5}$$

where $w_z$ represents the corrected yaw rate of the motor vehicle; where $x_R^B$ represents an X-coordinate of the radar unit on the motor vehicle; where $y_R^B$ represents a Y-coordinate of the radar unit on the motor vehicle; where $\beta_0$ represents a nominal mounting azimuth angle of the radar unit; where $\beta$ represents a calibration error of the radar unit; where $\hat{\phi}_i$ represents the radar heading associated with the tracking signal; where $v_y$ represents a lateral velocity of the motor vehicle; where $v_x$ represents a longitudinal velocity of the motor vehicle; where $\hat{v}_{x,wss}$ represents an estimated longitudinal velocity of the motor vehicle; where $\hat{d}_i$ represents the doppler speed associated with the tracking signal; where $\alpha_{gyro}$ represents the gyro scale factor; where $\alpha_{wss}$ represents a wheel speed sensor scale factor; where $\gamma_{gyro}$ represents the gyro drift; where n represents an iid noise; and where $\hat{w}_{z,gyro}$ represents the measured yaw rate associated with the gyro signal generated by the gyroscope.

The processor 124 is programmed to predict at least one of the predicted radar heading, the predicted doppler, an estimated gyro scale factor of the gyroscope, a wheel speed sensor scale factor of the wheel speed sensor, and the gyro drift of the gyroscope 108 based on the updated Kalman filter. More specifically, the processor 124 is programmed to predict at least one of an estimated gyro scale factor, a wheel speed sensor scale factor, and the gyro drift based on the updated Kalman filter with a process model according to:

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t \quad \text{Eq. 6}$$

where $G_u$ represents a predictor for the gyro drift; where t represents the current time step; and where t+1 represents a next time step.

The processor 124 is further programmed to predict at least one of the estimated gyro scale factor, the wheel speed sensor scale factor, and the gyro drift based on the updated Kalman filter with a process noise according to:

$$Q = \begin{pmatrix} \sigma_{w_z}^2 & & & & & & \\ & \sigma_{v_x}^2 & & & & & \\ & & \sigma_{v_y}^2 & & & & \\ & & & \sigma_{\alpha_{gyro}}^2 & & & \\ & & & & \sigma_{\alpha_{wss}}^2 & & \\ & & & & & P_u & \\ & & & & & & \sigma_\epsilon^2 \end{pmatrix} \quad \text{Eq. 7}$$

The processor 124 is further programmed to predict the gyro drift according to:

$$G_u(x_v) = K_{vu} K_{uu}^{-1} \quad \text{Eq. 8}$$

$$P_u(x_v) = K_{vv} K_{uu}^{-1} - G_u(x_v) K_{uv} \quad \text{Eq. 9}$$

$$K_{ij} = [k(x_i, x_j)] \quad \text{Eq. 10}$$

where the gyro drift is modeled as a zero mean Gaussian process with a known covariance kernel $k(\cdot,\cdot)$.

The processor 124 is further programmed to predict the gyro drift of the gyroscope according to $$x = (t \; v \; w \; T_w)^{T_w} \quad \text{Eq. 11}$$

$$x_u = (x_{t-T_w}, \ldots x_{t-1}, x_t) \quad \text{Eq. 12}$$

$$x_v = (x_{t-T_w+1}, \ldots x_t, x_{t+1}) \quad \text{Eq. 13}$$

where x represents an independent predictor variable for the gyro drift of the gyroscope; where t represents the current time step; where v represents the longitudinal velocity; where w represents the yaw rate; where $x_u$ represents a predictive variable for the gyro drift of the gyroscope for the previous time step; and where $x_v$ represents a predictive variable for the gyro drift of the gyroscope for the current time step.

The processor 124 is further programmed to predict the gyro drift of the gyroscope according to a spectral mixture kernel:

$$k(d) = \sum_{i=1}^{N} \sigma_i^2 \exp\left(2\pi^2 d^T \left(\sum_i C\right)^{-1} d\right) \cos(2\pi d f_i) \quad \text{Eq. 14}$$

where $C = C(\psi)$ is a spherically parameterized correlation matrix which models a correlation between the predictor variables for the previous and current time steps and $\Sigma_i = \text{diag}(\sigma_i^{(1)} \ldots \sigma_i^{(4)})$; where a plurality of parameters $\{\sigma_i^2, \Sigma_i, f_i\}_{i=1}^{N}, \psi$ is learned from data. For computational reasons, the predictor vectors may be assumed to lay on a regular grid so that the Kronecker structure may be exploited.

Figure 2:
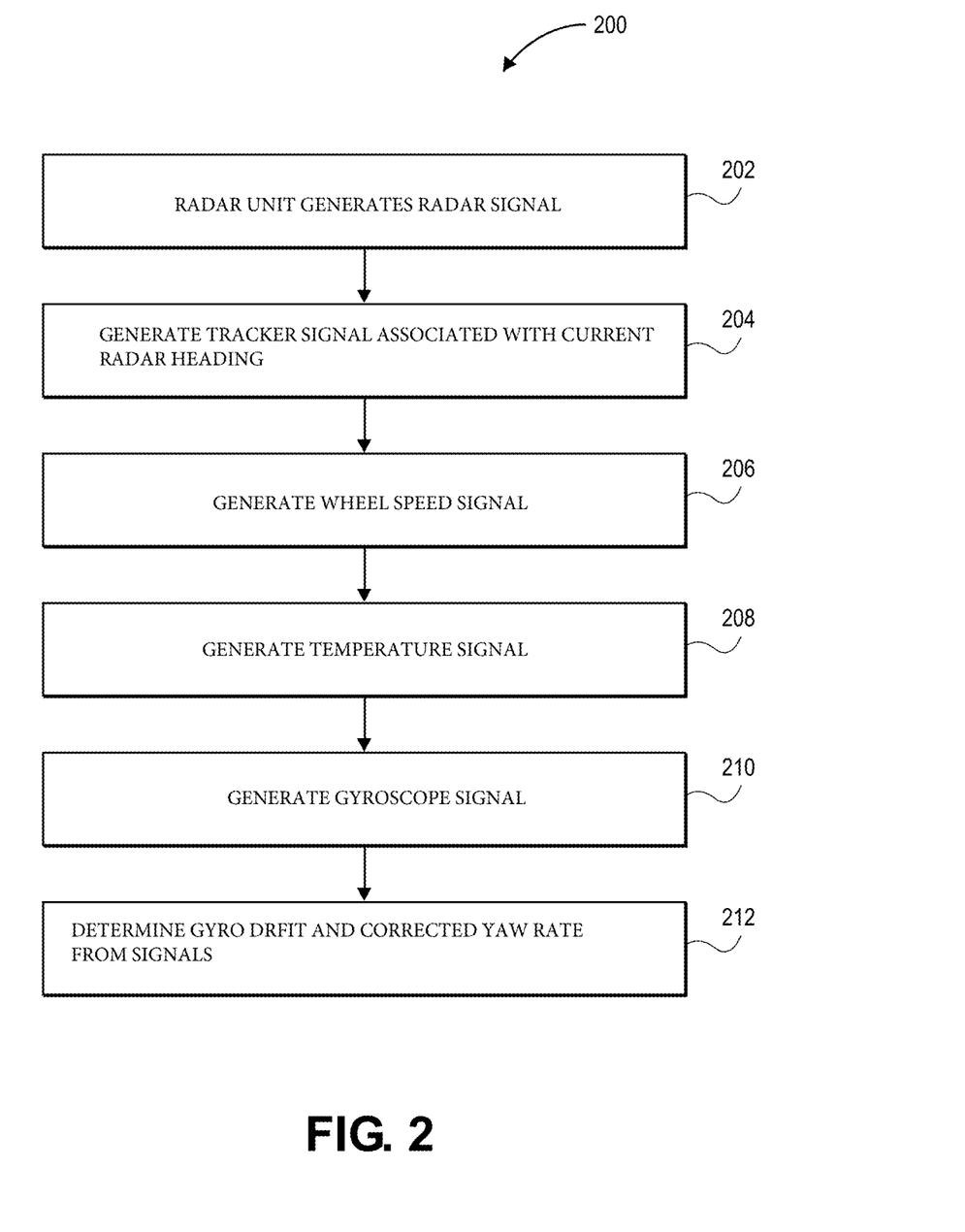
FIG. 2 is a flow chart of one example of a process for operating the system of FIG. 1.

Referring now to FIG. 2, one non-limiting example of a process 200 for operating the system 102 illustrated in FIG. 1. The process 200 commences at block 202 with the radar unit 118 generating the radar signal associated with the detected target 128 positioned about the motor vehicle 100.

At block 204, the tracker 120 generates the tracker signal associated with the current radar heading and the current doppler for the stationary target based on the radar signal.

At block 206, the wheel speed sensor 110, 112 generates the wheel speed signal associated with the current velocity of the motor vehicle 100.

At block 208, the temperature sensor 120 generates the temperature signal associated with the ambient temperature.

At block 210, the gyroscope 108 generates a gyro signal associated with a measured yaw rate at a current time step.

At block 212, while the motor vehicle 100 is in motion, the processor 124 determines the gyro drift and the corrected yaw rate while the motor vehicle 100 is in motion, with the gyro drift and the corrected yaw rate being based on at least the current radar heading, the current doppler effect, and the current velocity of the motor vehicle, and the measured yaw rate at the current time step. More specifically, the processor 124 receives the gyro signal from the gyroscope 108, and the wheel speed signal from the wheel speed sensor 110, 112, the tracker signal from the tracker 120, and the temperature signal from the temperature sensor 122 at the current time step. The processor 124 uses a Kalman filter to determine an innovation, based on a difference between the tracker signal, the wheel speed signal, the temperature signal, the gyro signal, and a plurality of associated predicted observations according to Equation 1 above. The processor further generates the adapted measurement covariance matrix for robustness, based on the whitened innovation determined at the current time step, and further based on a measurement covariance matrix according to Equations 2 through 4 above. The processor 124 further updates the Kalman filter based on the tracker signal, the wheel speed signal, the temperature signal, and the gyro signal according to Equation 5 above.

At block 214, the processor 124 predicts at least one of the predicted radar heading, the predicted doppler, an estimated gyro scale factor of the gyroscope, a wheel speed sensor scale factor of the wheel speed sensor, and the gyro drift of the gyroscope, based on the updated Kalman filter according to Equations 6 through 15 above.

Thus, there has been described a machine learning system that includes a fuzzy controller that receives a dataset, such as a plurality of state-action values, from a reinforcement learning agent (RLA) controller. The controllers may be embodied in software, in hardware, or in a combination thereof. By using the two controllers in series, where the output of the RLA controller (data) is received as input to the fuzzy controller, a machine learning system can be created where the output data is interpretable using the fuzzy controller. In this manner, engineers, system designers, etc. may more fully appreciate and/or troubleshoot their implementations.

According to one non-limiting example, the computers 106 may include a vehicle engine control computer, a vehicle braking system computer, and a vehicle steering control computer, where each of the computers 106 execute instructions to carry out at least one autonomous or partially-autonomous vehicle operation (e.g., such as adaptive cruise control (ACC), lane keeping assist, lane departure warning, forward-collision warning, automated emergency braking, pedestrian detection, and blind spot warning, just to name a few examples). It should be appreciated that system 102 does not require multiple computers; e.g., it may have more computers. And the vehicle engine control computer, the vehicle braking system computer, and the vehicle steering control computer are merely examples. A non-exhaustive and non-limiting list of vehicle computers could include a body control module (BCM), a powertrain control module (PCM), a power transfer unit (PTU), and a suspension control module, just to name a few examples. As will be described more below, by system 102 providing an output to one or more of computers 106, system 102 may initiate a vehicle function (e.g., such as controlling vehicle acceleration, controlling vehicle braking, and/or controlling vehicle steering).

In general, the computing systems and/or devices described may employ any of a number of computer operating systems, including, but by no means limited to, versions and/or varieties of the MYLINK or INTELLILINK application. Examples of computing devices include, without limitation, an on-board vehicle computer, a computer workstation, a server, a desktop, notebook, laptop, or hand-held computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, JAVA, C, C++, VISUAL BASIC, JAVA SCRIPT, PERL, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated there-with (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system of a motor vehicle, the system comprising:
a radar unit for generating a radar signal associated with a detected target positioned about the motor vehicle;
a tracker coupled to the radar unit and generating a tracker signal associated with a current radar heading and a current doppler for a stationary target based on the radar signal;
a wheel speed sensor for generating a wheel speed signal associated with a current velocity of the motor vehicle;
a temperature sensor for generating a temperature signal associated with an ambient temperature;
a gyroscope for generating a gyro signal associated with a measured yaw rate at a current time step; and
a computer comprising:
at least one processor coupled to the tracker, the wheel speed sensor, the temperature sensor, and the gyroscope; and
a non-transitory computer readable storage medium including instructions such that the at least one processor is programmed to:
receive the tracker signal from the tracker, the wheel speed signal from the wheel speed sensor, the temperature signal from the temperature sensor, and the gyro signal from the gyroscope at the current time step;
determine with a Kalman filter an innovation vector, based on a difference between the tracker signal, the wheel speed signal, the temperature signal, the gyro signal, and a plurality of associated predicted observations;
generate an adapted measurement covariance matrix, based on the innovation vector, and further based on a measurement covariance matrix;
update the Kalman filter based on the tracker signal, the wheel speed signal, the temperature signal, and the gyro signal;
predict at least one of the predicted radar heading, the predicted doppler, an estimated gyro scale factor of the gyroscope, a wheel speed sensor scale factor of the wheel speed sensor, and a gyro drift of the gyroscope based on the updated Kalman filter; and
determine a corrected yaw rate while the motor vehicle is in motion, with the corrected yaw rate based on at least the current radar heading, the current doppler effect, and the current velocity of the motor vehicle, and the measured yaw rate at the current time step.

2. The system of claim 1 where the at least one processor determines a whitened innovation e according to a maximum correntropy variation of the Kalman filter, by computing:

$$\hat{e} = R^{-\frac{1}{2}}e$$

where e represents a current innovation, related to an error between an actual measurement vector z and a predicted measurement vector (i.e. e=z−Hx, where x is a predicted state vector and H is a linearized measurement covariance matrix); and
where $$R^{-\frac{1}{2}}$$

indicates an inverse of a Cholesky decomposition of the linearized measurement covariance matrix.

3. The system of claim 2 where the at least one processor generates the adapted measurement covariance matrix according to:

$$\kappa_\beta(x) = e^{-\frac{x^2}{2\beta^2}}$$

$$C = \text{diag}(\kappa_\beta(\hat{e}_1), \ldots \kappa_\beta(\hat{e}_N))$$

$$\hat{R} = R^{\frac{1}{2}} C^{-1} R^{\frac{T}{2}}$$

where $K_\beta(x)$ represents a kernel function;

where $\beta$ represents a positive tuning parameter;

where $\hat{e}_i$ represents an element i in a vector $\hat{e}$;

where C represents the adapted measurement covariance matrix;

where $\hat{R}$ represents an updated measurement covariance matrix; and where T represents a matrix transpose operator.

4. The system of claim 3 where the at least one processor updates the Kalman filter with an implicit nonlinear observation model to estimate at least a gyro scale factor and the gyro drift according to:

$$\begin{pmatrix} w_z x_R^B \sin(\beta_o + \beta + \hat{\phi}_i) - w_z y_R^B \cos(\beta_o + \beta + \hat{\phi}_i) + \\ v_y \sin(\beta_o + \beta + \hat{\phi}_i) + v_x \cos(\beta_o + \beta + \hat{\phi}_i) + \hat{d}_i \\ \ldots \\ \alpha_{gyro} w_z + \gamma_{gyro} - \hat{w}_{z,gyro} \\ \alpha_{wss} v_x - \hat{v}_{x,wss} \end{pmatrix} = 0$$

where $w_z$ represents the corrected yaw rate of the motor vehicle;

where $x_R^B$ represents an X-coordinate of the radar unit on the motor vehicle;

where $y_R^B$ represents a Y-coordinate of the radar unit on the motor vehicle;

where $\beta_0$ represents a nominal mounting azimuth angle of the radar unit;

where $\beta$ represents a calibration error of the radar unit;

where $\hat{\phi}_i$ represents the radar heading associated with the tracking signal;

where $v_y$ represents a lateral velocity of the motor vehicle;

where $v_x$ represents a longitudinal velocity of the motor vehicle;

where $\hat{v}_{x,wss}$ represents an estimated longitudinal velocity of the motor vehicle;

where $\hat{d}_i$ represents the doppler speed associated with the tracking signal;

where $\alpha_{gyro}$ represents the gyro scale factor;

where $\alpha_{wss}$ represents the wheel speed sensor scale factor;

where $\gamma_{gyro}$ represents the gyro drift;

where n represents an iid noise; and where $\hat{w}_{z,gyro}$ represents the measured yaw rate associated with the gyro signal generated by the gyroscope.

5. The system of claim 4 where the at least one processor predicts at least one of the estimated gyro scale factor, the wheel speed sensor scale factor, and the gyro drift based on the updated Kalman filter with a process model according to:

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t$$

where $G_u$ represents a predictor for the gyro drift;

where t represents the current time step; and where t+1 represents a next time step.

6. The system of claim 5 where the at least one processor predicts the gyro drift of the gyroscope according to:

$$x = (t\ v\ w\ T_w)^{Tw}$$

$$x_u = (x_{t-T_w}, \ldots x_{t-1}, x_t)$$

$$x_v = (x_{t-T_w+1}, \ldots x_t, x_{t+1})$$

where x represents an independent predictor variable for the gyro drift of the gyroscope;

where t represents the current time step;

where v represents the longitudinal velocity;

where w represents the yaw rate; and where $x_u$ represents a predictive variable for the gyro drift of the gyroscope for the previous time step;

where $x_v$ represents a predictive variable for the gyro drift of the gyroscope for the current time step.

7. The system of claim 6 where the at least one processor further predicts the gyro drift of the gyroscope according to a spectral mixture kernel:

$$k(d) = \sum_{i=1}^{N} \sigma_i^2 \exp\left(2\pi^2 d^T \left(\sum_i C\right)^{-1} d\right) \cos(2\pi d f_i)$$

where $C = C(\psi)$ which is a spherically parameterized correlation matrix which models a correlation between the predictor variables for the previous and current time steps and $\Sigma_i = \text{diag}(\sigma_i^{(i)} \ldots \sigma_i^{(4)})$;

where a plurality of parameters $\{\sigma_i^2, \Sigma_i, f_i\}_{i=1}^{N}$, $\psi$ is learned from data.

8. A computer for a system of a motor vehicle, the system having a radar unit for generating a radar signal associated with a detected target positioned about the motor vehicle, a tracker coupled to the radar unit and generating a tracker signal associated with a current radar heading and a current doppler for a stationary target based on the radar signal, a temperature sensor for generating a temperature signal associated with an ambient temperature, a wheel speed sensor for generating a wheel speed signal associated with a current velocity of the motor vehicle, and a gyroscope for generating a gyro signal associated with a measured yaw rate at a current time step, the computer comprising:

at least one processor coupled to the tracker, the wheel speed sensor, and the gyroscope; and a non-transitory computer readable storage medium including instructions such that the at least one processor is programmed to:

receive the tracker signal from the tracker, the wheel speed signal from the wheel speed sensor, the temperature signal from the temperature sensor, and the gyro signal from the gyroscope at the current time step;

determine with a Kalman filter an innovation, based on a difference between the tracker signal, the wheel speed signal, the temperature signal, the gyro signal, and a plurality of associated predicted observations;

generate an adapted measurement covariance matrix, based on the innovation vector, and further based on a measurement covariance matrix;

update the Kalman filter based on the tracker signal, the wheel speed signal, the temperature signal, and the gyro signal;

predict at least one of the predicted radar heading, the predicted doppler, an estimated gyro scale factor of the gyroscope, a wheel speed sensor scale factor of the wheel speed sensor, and a gyro drift of the gyroscope based on the updated Kalman filter; and determine a corrected yaw rate while the motor vehicle is in motion, with the corrected yaw rate based on at least the current radar heading, the current doppler effect, and the current velocity of the motor vehicle, and the measured yaw rate at the current time step.

9. The computer of claim 8 where the at least one processor determines a whitened innovation e according to a maximum correntropy variation of the Kalman filter, by computing:

$$\hat{e} = R^{-\frac{1}{2}}e$$

where e represents a current innovation, related to an error between an actual measurement vector z and a predicted measurement vector (i.e. e=z−Hx, where x is a predicted state vector and H is a linearized measurement covariance matrix); and where $$R^{-\frac{1}{2}}$$

indicates an inverse of a Cholesky decomposition of the linearized measurement covariance matrix.

10. The computer of claim 9 where the at least one processor generates the adapted measurement covariance matrix according to:

$$\kappa_\beta(x) = e^{-\frac{x^2}{2\beta^2}}$$

$$C = \text{diag}(\kappa_\beta(\hat{e}_1), \ldots \kappa_\beta(\hat{e}_N))$$

$$\hat{R} = R^{\frac{1}{2}}C^{-1}R^{\frac{T}{2}}$$

where $K_\beta(x)$ represents a kernel function;

where $\beta$ represents a positive tuning parameter;

where $\hat{e}_i$ represents an element i in a vector $\hat{e}$;

where C represents the adapted measurement covariance matrix;

where $\hat{R}$ represents an updated measurement covariance matrix; and where T represents a matrix transpose operator.

11. The computer of claim 10 where the at least one processor updates the Kalman filter with an implicit nonlinear observation model to estimate at least a gyro scale factor and the gyro drift according to:

$$\begin{pmatrix} w_z x_R^B \sin(\beta_0 + \beta + \hat{\phi}_i) - w_z y_R^B \cos(\beta_0 + \beta + \hat{\phi}_i) + \\ v_y \sin(\beta_o + \beta + \hat{\phi}_i) + v_x \cos(\beta_o + \beta + \hat{\phi}_i) + \hat{d}_i \\ \ldots \\ \alpha_{gyro} w_z + \gamma_{gyro} - \hat{w}_{z,gyro} \\ \alpha_{wss} v_x - \hat{v}_{x,wss} \end{pmatrix} = 0$$

where $w_z$ represents the corrected yaw rate of the motor vehicle;

where $x_R^B$ represents an X-coordinate of the radar unit on the motor vehicle;

where $y_R^B$ represents a Y-coordinate of the radar unit on the motor vehicle;

where $\beta_0$ represents a nominal mounting azimuth angle of the radar unit;

where $\beta$ represents a calibration error of the radar unit;

where $\hat{\phi}_i$ represents the radar heading associated with the tracking signal;

where $v_y$ represents a lateral velocity of the motor vehicle;

where $v_x$ represents a longitudinal velocity of the motor vehicle;

where $\hat{v}_{x,wss}$ represents an estimated longitudinal velocity of the motor vehicle;

where $\hat{d}_i$ represents the doppler speed associated with the tracking signal;

where $\alpha_{gyro}$ represents the gyro scale factor;

where $\alpha_{wss}$ represents the wheel speed sensor scale factor;

where $\gamma_{gyro}$ represents the gyro drift;

where n represents an iid noise;

where $\hat{w}_{z,gyro}$ represents the measured yaw rate associated with the gyro signal generated by the gyroscope.

12. The computer of claim 11 where the at least one processor predicts at least one of the estimated gyro scale factor, the wheel speed sensor scale factor, and the gyro drift based on the updated Kalman filter with a process model according to:

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t$$

where $G_u$ represents a predictor for the gyro drift;

where t represents the current time step; and where t+1 represents a next time step.

13. A process of operating a system for a motor vehicle, with the system including a radar unit, a tracker coupled to the radar unit, a wheel speed sensor, a temperature sensor, a gyroscope, and a computer coupled to the tracker, the wheel speed sensor, the temperature sensor, and the gyroscope, and the computer including a at least one processor and a non-transitory computer readable storage medium including instructions, the process comprising:

generating, using the radar unit, a radar signal associated with a detected target positioned about the motor vehicle;

generating, using the tracker, a tracker signal associated with a current radar heading and a current doppler for a stationary target based on the radar signal;

generating, using the wheel speed sensor, a wheel speed signal associated with a current velocity of the motor vehicle;

generating, using the temperature sensor, a temperature signal associated with an ambient temperature;

generating, using the gyroscope, a gyro signal associated with a measured yaw rate at a current time step;

receiving, with the at least one processor, the tracker signal from the tracker, the gyro signal from the gyroscope, and the wheel speed signal from the wheel speed sensor at the current time step;

determining, with the at least one processor using a Kalman filter, an innovation vector, based on a difference between the tracker signal, the wheel speed signal, the temperature signal, the gyro signal, and a plurality of associated predicted observations;

generating, using the at least one processor, an adapted measurement covariance matrix, based on the innovation vector, and further based on a measurement covariance matrix;

updating, using the at least one processor, the Kalman filter based on the tracker signal, the wheel speed signal, the temperature signal, and the gyro signal;

predicting, using the at least one processor, at least one of the predicted radar heading, the predicted doppler, an estimated gyro scale factor of the gyroscope, a wheel speed sensor scale factor of the wheel speed sensor, and a gyro drift of the gyroscope based on the updated Kalman filter; and determining, with the at least one processor, a corrected yaw rate while the motor vehicle is in motion, with the corrected yaw rate based on at least the current radar heading, the current doppler effect, and the current velocity of the motor vehicle, and the measured yaw rate at the current time step.

14. The process of claim 13 where the at least one processor determines the gyro drift according to:

$$\hat{e} = R^{-\frac{1}{2}} e$$

$$\kappa_\beta(x) = e^{-\frac{x^2}{2\beta^2}}$$

$$C = \mathrm{diag}(\kappa_\beta(\hat{e}_1), \ldots \kappa_\beta(\hat{e}_N))$$

$$\hat{R} = R^{\frac{1}{2}} C^{-1} R^{\frac{T}{2}}$$

$$\begin{pmatrix} w_z x_R^B \sin(\beta_0 + \beta + \hat{\phi}_i) - w_z y_R^B \cos(\beta_o + \beta + \hat{\phi}_i) + \\ v_y \sin(\beta_o + \beta + \hat{\phi}_i) + v_x \cos(\beta_o + \beta + \hat{\phi}_i) + \hat{d}_i \\ \ldots \\ \alpha_{gyro} w_z + \gamma_{gyro} - \hat{w}_{z,gyro} \\ \alpha_{wss} v_x - \hat{v}_{x,wss} \end{pmatrix} = 0$$

$$\begin{pmatrix} w_z \\ v_x \\ v_y \\ \alpha_{gyro} \\ \alpha_{wss} \\ \gamma_{gyro} \\ \beta \end{pmatrix}_{t+1} = \begin{pmatrix} 1 & & & & & & \\ & 1 & & & & & \\ & & 1 & & & & \\ & & & 1 & & & \\ & & & & 1 & & \\ & & & & & G_u & \\ & & & & & & 1 \end{pmatrix} \begin{pmatrix} w_z \\ v_x \\ v_y \\ \alpha_{gyro} \\ \alpha_{wss} \\ \gamma_{gyro} \\ \beta \end{pmatrix}_t$$

where e represents the current innovation, related to an error between the actual measurement vector z and the predicted measurement vector (i.e. e=z−Hx, where x is the predicted state vector and H is the linearized measurement covariance matrix);

where $$R^{-\frac{1}{2}}$$

indicates the inverse of the Cholesky decomposition of the measurement covariance matrix;

where e represents a previous innovation determined at the previous time step;

where $K_\beta(x)$ represents a kernel function;

where β represents a positive tuning parameter;

where $\hat{e}_i$ represents an element i in a vector ê;

where C represents the adapted measurement covariance matrix;

where $\hat{R}$ represents an updated measurement covariance matrix;

where T represents a matrix transpose operator;

where $w_z$ represents the corrected yaw rate of the motor vehicle;

where $x_R^B$ represents an X-coordinate of the radar unit on the motor vehicle;

where $y_R^B$ represents a Y-coordinate of the radar unit on the motor vehicle;

where $\beta_0$ represents a nominal mounting azimuth angle of the radar unit;

where β represents a calibration error of the radar unit;

where $\hat{\phi}_i$ represents the radar heading associated with the tracking signal;

where $v_y$ represents a lateral velocity of the motor vehicle;

where $v_x$ represents a longitudinal velocity of the motor vehicle;

where $\hat{v}_{x,wss}$ represents an estimated longitudinal velocity of the motor vehicle;

where $\hat{d}_i$ represents the doppler speed associated with the tracking signal;

where $\alpha_{gyro}$ represents the gyro scale factor;

where $\alpha_{wss}$ represents the wheel speed sensor scale factor;

where $\gamma_{gyro}$ represents the gyro drift;

where n represents an iid noise;

where $\hat{w}_{z,gyro}$ represents the measured yaw rate associated with the gyro signal generated by the gyroscope;

where $G_u$ represents a predictor for the gyro drift;

where t represents the current time step; and where t+1 represents a next time step.

\* \* \* \* \*